W. J. REID.
AUTOMOBILE TIRE TOOL.
APPLICATION FILED OCT. 2, 1913.
1,116,924.
Patented Nov. 10, 1914.
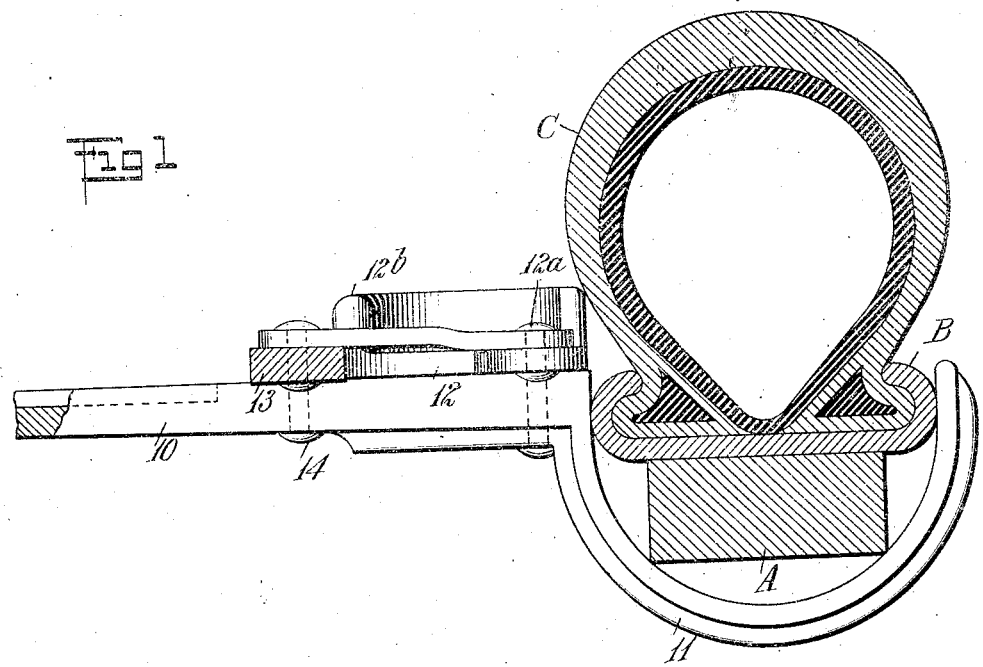
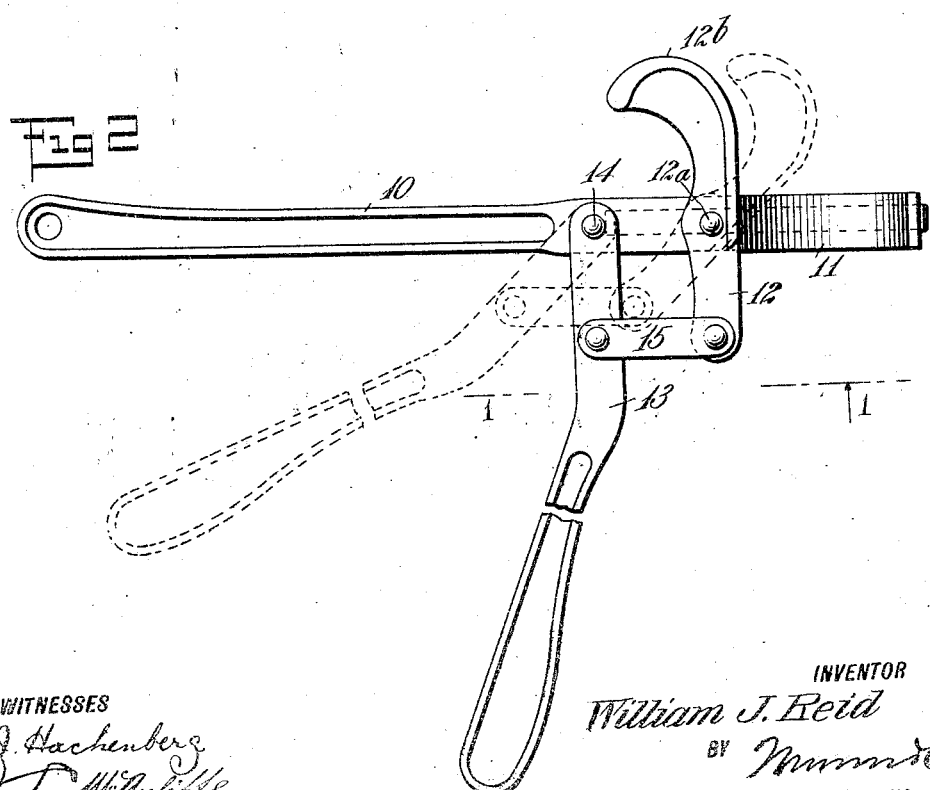
WITNESSES
INVENTOR
William J. Reid
ATTORNEYS

UNITED STATES PATENT OFFICE.

WILLIAM JAMES REID, OF GANANOQUE, ONTARIO, CANADA.

AUTOMOBILE TIRE-TOOL.

1,116,924.     Specification of Letters Patent.     Patented Nov. 10, 1914.

Application filed October 2, 1913. Serial No. 792,911.

*To all whom it may concern:*

Be it known that I, WILLIAM JAMES REID, a subject of the King of Great Britain, and a resident of Gananoque, in the Province of Ontario, Dominion of Canada, have invented a new and Improved Automobile Tire-Tool, of which the following is a full, clear, and exact description.

My invention relates to an improved tool for use in attaching and detaching the tires of automobile wheels. In my improved device the lever has its front end in the form of a rigid, forwardly-extending hook presenting an open side to receive the wheel rim and tire rim, and in connection with the said lever I provide a novel tire-pressing device to compress the tire transversely, the tool being rockable as usual in tools of this character in a plane transverse to the rims and tire.

The invention will be particularly explained in the specific description following.

Reference is to be had to the accompanying drawings forming a part of this specification, in which similar characters of reference indicate corresponding parts in both the views.

Figure 1 is a sectional side view on the line 1—1 of Fig. 2, showing a tool embodying my invention applied to a wheel rim, tire rim, and tire, and Fig. 2 is a plan view thereof.

The body of the tool is in the form of a lever 10 and has at the front end thereof a forwardly ranging hook 11 which is disposed in the plane of the lever, and presents an open side to receive the rim A of a wheel, and a tire rim B.

Mounted on the lever 10 is a presser device 12 to engage and compress the tire C. The presser device 12 is fulcrumed as at 12ª on the lever adjacent to the inner end of the curved hook 11, and is disposed in a plane at an angle approximately normal to the plane of said hook, and is rockable transversely to the general direction of the lever and to the plane of the hook 11.

To actuate the presser device 12, a second lever 13 is fulcrumed at one end on the lever 10 as at 14, by rivets or the like, and a link 15 is pivotally connected with said second lever, between its ends, and with one laterally projecting arm of the presser device 12, so that by throwing the lever 13 toward and from the main lever 10, the presser device will be rocked on its pivot 12ª. The presser device at the side of the lever 10 opposite the link 15, projects laterally beyond said lever, and presents a broad surface to be pressed against the tire C, for compressing the latter. As is best seen in Fig. 2, the free end of the last mentioned arm of the presser device is returned rearwardly, as at 12ᵇ in curved form, presenting a rounding surface to contact with the tire.

In use, the hook 11 is placed under the rims, as indicated in Fig. 1, spanning the tire rim B, with the main lever 10 disposed laterally. The tool having been thus positioned, the second lever 13 is brought to the position indicated in dotted lines in Fig. 2, thereby drawing rearwardly on the adjacent arm of the presser device 12, and throwing the opposite presser arm against the side of the tire above the tire rim, to press the tire transversely. The tool is then rocked bodily, the center of movement being the axis of the curved hook 11. In this bodily rocking of the tool, the gripping action of the presser device 12 will serve to detach the tire. The tool, it is obvious, is also useful to press the side of the tire inward in attaching the tire to the rim of the wheel.

The device, it will be observed, is distinguished from the general type of tools in which jaws are disposed for relative rocking movement in the same plane, and wherein the one jaw presents an end thereof against the tire.

Having thus described my invention, I claim as new and desire to secure by Letters Patent:

1. A tire tool, comprising a lever having at its front end a forwardly extending hook presenting an open side to receive a wheel rim and tire rim and adapted to rock bodily thereon with the center of movement corresponding approximately with the axis of the hook; and a tire-pressing device mounted on the lever to move in a plane transverse to the plane of the rocking of the lever.

2. A tire tool, comprising a lever having at its front end a rigid, forwardly-disposed curved hook presenting an open side to receive a wheel rim and tire rim, and adapted to rock bodily thereon; a tire-pressing device pivoted on the lever to rock in a plane transverse to the plane of the rocking of the lever, and means for rocking the presser device in its own plane relatively to the lever.

3. A tire tool, comprising a lever having a rigid hook extending forwardly from the front end of the lever, the hook presenting an open side to receive a wheel rim and a tire rim, and said lever constituting a means to rock the device bodily in the plane of the hook; a tire-pressing device pivotally mounted on the lever and movable in a plane approximately normal to the plane of the hook, and a second lever fulcrumed on the first lever and operatively connected with the tire-pressing device, to rock the same, the said second lever having a movement toward and from the first lever in a plane transverse to the plane of the hook and the tire-pressing device and its lever being rockable bodily with the first lever and the hook.

In testimony whereof I have signed my name to this specification in the presence of two subscribing witnesses.

WILLIAM JAMES REID.

Witnesses:
   H. J. FRAMES,
   E. C. DYGERT.